United States Patent [19]
Dhooge

[11] 3,766,363
[45] Oct. 16, 1973

[54] ADMISSION CONTROL SYSTEM

[75] Inventor: Jacque R. Dhooge, Overland Park, Kans.

[73] Assignee: Drive-In Theatre Manufacturing Company, Kansas City, Mo.

[22] Filed: Sept. 5, 1972

[21] Appl. No.: 286,118

[52] U.S. Cl.......... 235/61.6 R, 235/61.8 A, 340/51
[51] Int. Cl......................... G06k 15/00, G08g 1/14
[58] Field of Search.................. 235/61.6 R, 61.7 R, 235/61.8 A; 340/31, 51

[56] References Cited
UNITED STATES PATENTS

| 3,541,308 | 11/1970 | Ruby | 235/61.6 R |
| 3,575,586 | 4/1971 | Kroll | 340/51 |
| 3,604,898 | 9/1971 | Magnusson | 235/61.6 R |
| 3,705,976 | 12/1972 | Platzman | 235/61.8 A |

Primary Examiner—Daryl W. Cook
Attorney—Claude A. Fishburn et al.

[57] ABSTRACT

An admission control system for use with an admission center through which vehicles normally pass and wherein a predetermined fare is normally collected includes at least one ticket dispensing unit and signal generating circuits are activated by operation of the ticket dispensing unit and in response to dispensing of tickets and are operative to generate a signal corresponding to the number of tickets dispensed and signal conversion circuits are electrically connected to the signal generating circuits and are operative to convert the generated signal to a drive signal operative to drive indicating elements of a display unit to a position corresponding to the total price for the number of tickets dispensed. Vehicle sensing means are responsive to a vehicle passing thereby and in the form of a pair of spaced loops are positioned adjacent the admission center and adjacent a path of travel of vehicles passing through the admission center and are electrically connected to vehicle detecting circuits which are operative to electrically detect a vehicle and the direction of travel thereof and to activate the signal generating circuits and alarm assembly circuits which are electrically connected to the vehicle detecting circuits and to the signal generating circuits and the alarm circuits are operative to generate an alarm signal in response to a vehicle passing through the admission center without operation of the ticket dispensing assembly or operation thereof beyond selected limits as to number and valve of tickets.

13 Claims, 8 Drawing Figures

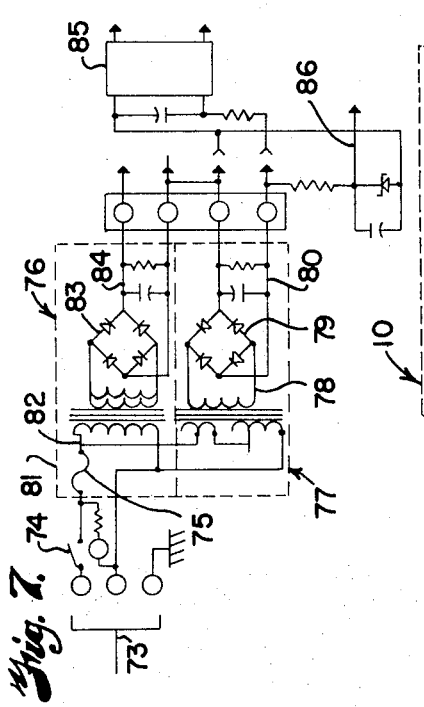
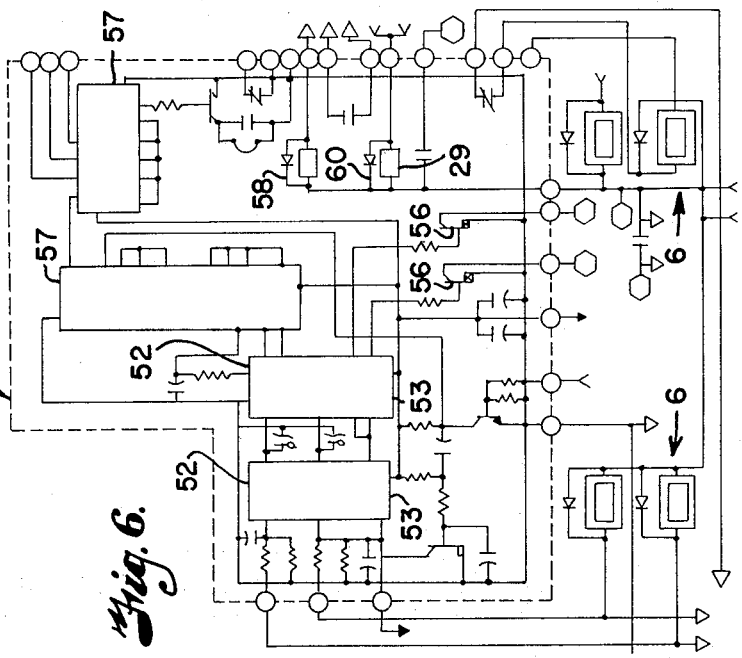
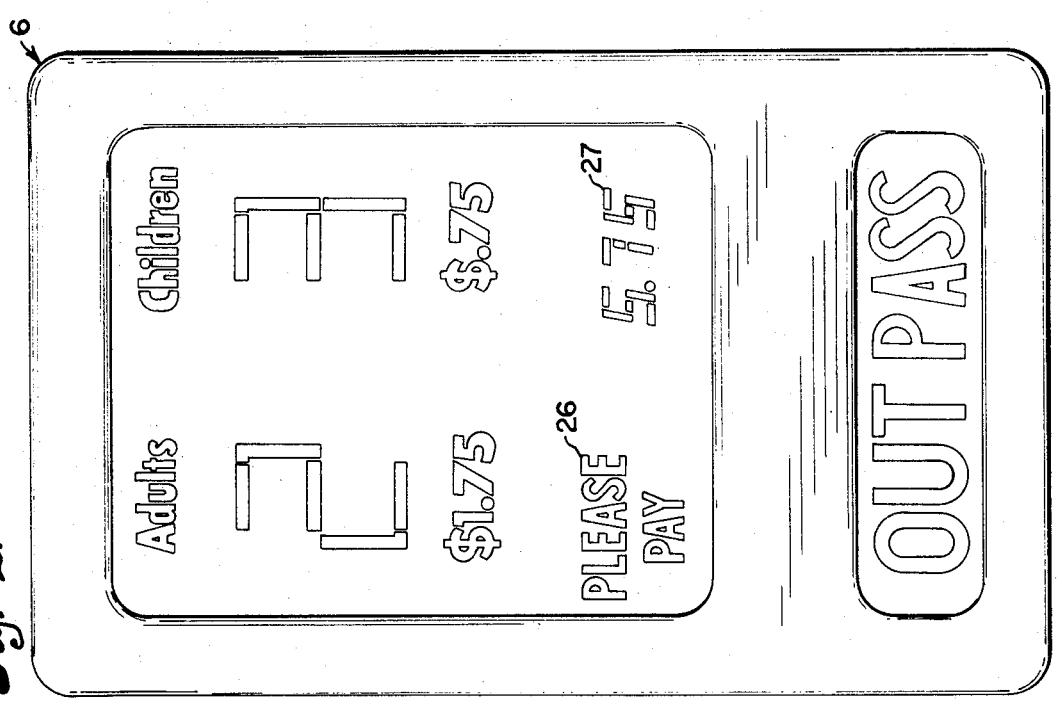

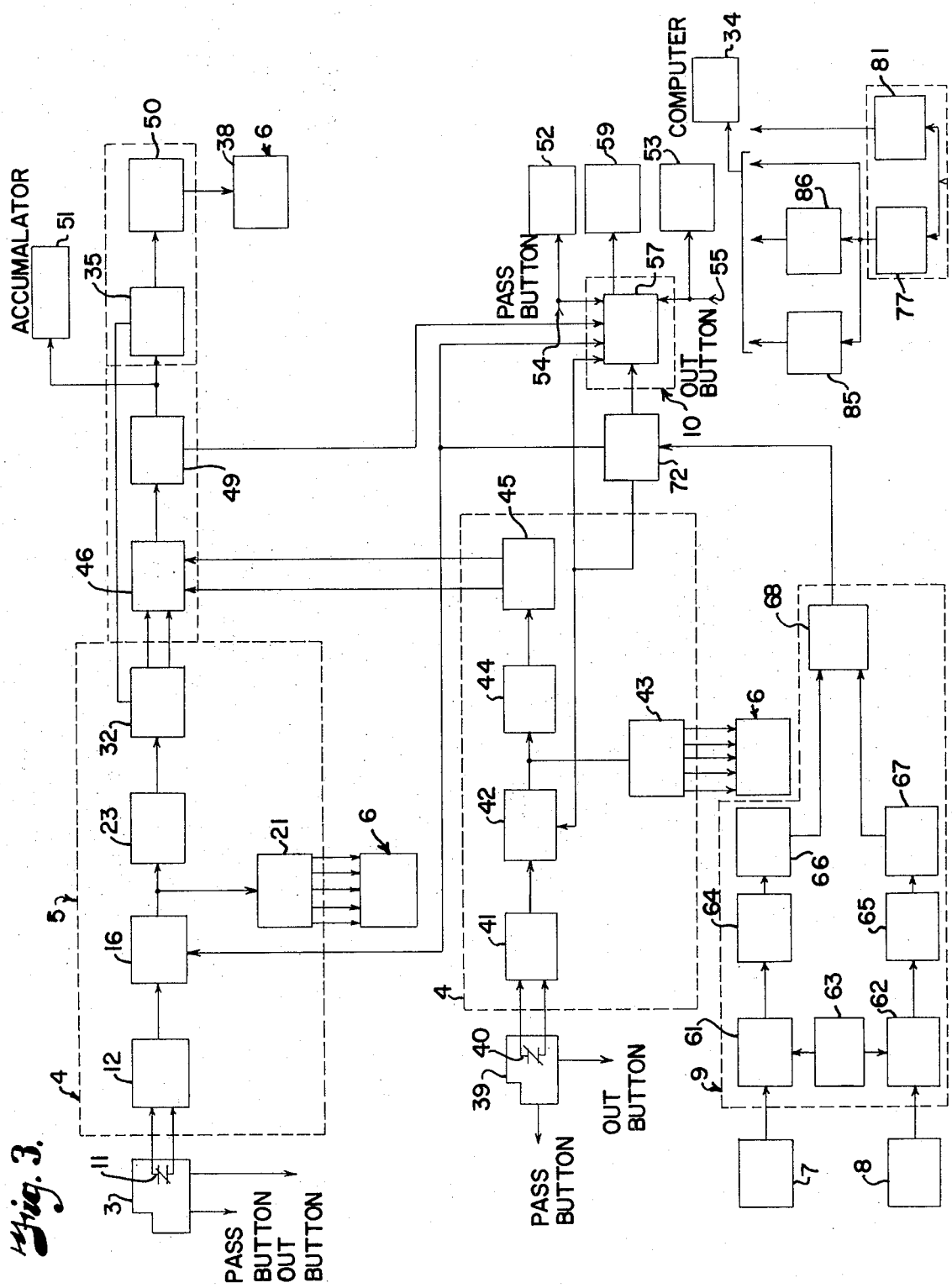

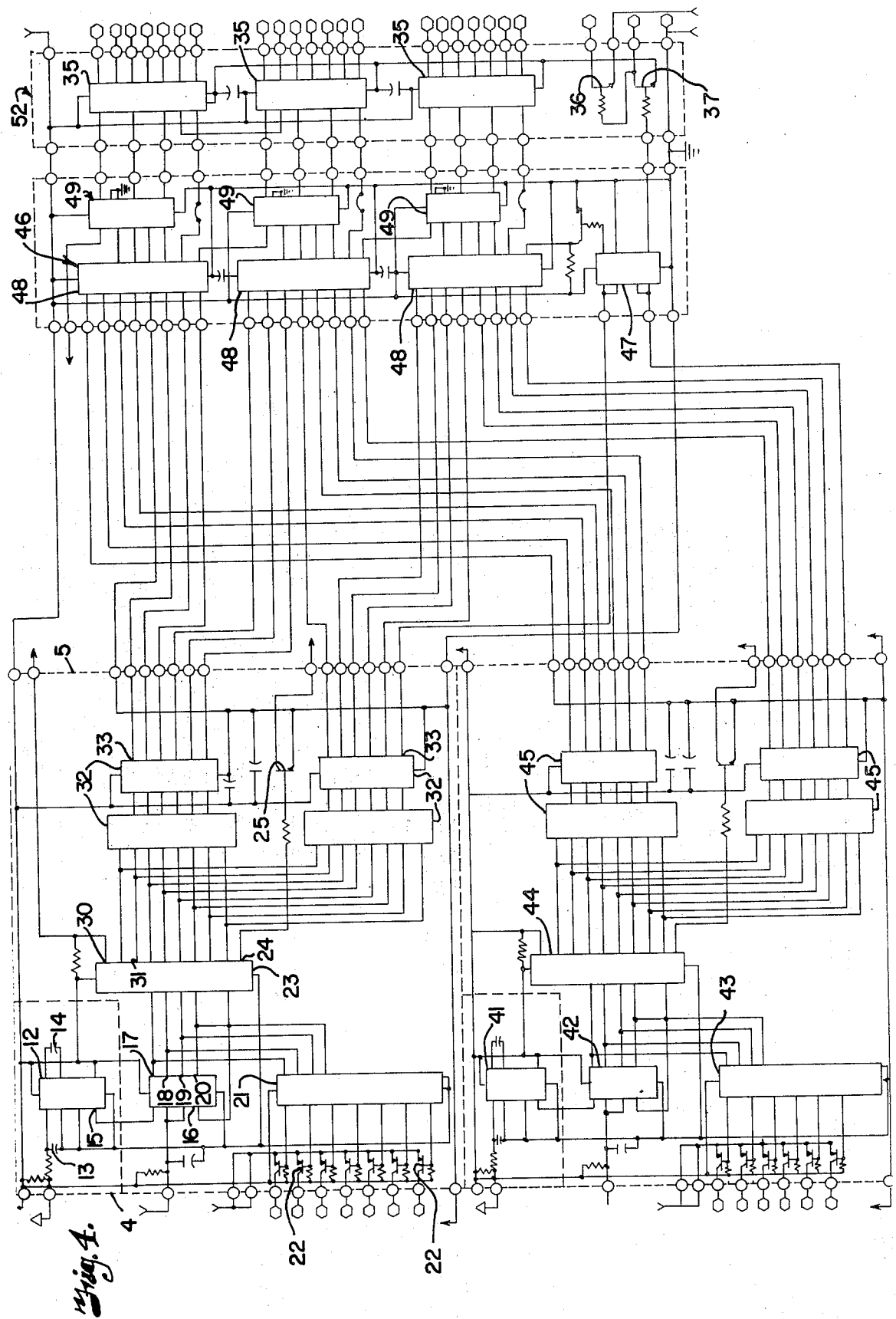

ADMISSION CONTROL SYSTEM

The present invention relates to an admission control system and more particularly to an admission control system for use with an admission center through which vehicles normally pass and wherein a predetermined fare is normally collected.

An admission center wherein the bargain and sale of admission is transacted is one of the key centers of a business such as an outdoor theatre or the like. Customer awareness of the consideration which is to be paid is desirable and it is also desirable that the management be aware of the transaction and further that the management have an accurate account of the series of transactions which normally occur. Outdoor theatre operation for example, often includes arrival of a group as a unit wherein the person in charge of the group may not be actually acquainted with the charge of admission inasmuch as many outdoor theatres do not charge for children under a specified age. Also due to the good spirits of the group in such a situation, the head of the group may at times deal more lightly with the transaction than he would in his normal business activity. Therefore, for the protection of the group, there should be an easily viewed indication of the total admission charge so that the head of the group may properly count his change and further be acquainted with the policies of the establishment.

Monitoring of the admission charge by the management is very essential in order that management can more fully and clearly acquaint the employees with the particular policies which the management has set forth. It is also very essential that the admission charge be readily viewed by a monitor and that the monitor have visual access to a plurality of admission centers to insure that the policies of the management are followed through and to instruct the employees in the particular aspects thereof.

Modern business cannot exist without an accurate and efficient bookkeeping system and further, if the bookkeeping system has incorporated therein automatic recorders for indicating the number of admissions and the number of admission per vehicle which have entered, there is also provided to management a more thorough understanding of the customer and the customer's habits. Also a record of the size of the group which enters an establishment, such as an outdoor theatre, is very useful in that management may provide services and considerations in accordance therewith which will induce the groups to return again.

The principal objects of the present invention are: to provide an admission control system for use with an admission center through which vehicles normally pass and wherein a predetermined fare is normally collected and which incorporates the above stated desirable features of business operation; to provide such an admission control system adapted to display the total admission price even in a multi-price system all without requiring mental calculations; to provide such an admission control system which is easy to modify for price changes by replacement of selected components; to provide such an admission control system which may be expanded from a one-price, one-lane system to a multi-price, two-lane system by the addition of selected components; to provide such an admission control system having the controls therefor enclosed within a substantially tamper-proof housing; to provide such an admission control system adapted to be operated by one cashier and which will maintain agreement between a ticket-dispensing unit or units and information recorded by the admission control system; to provide such an admission control system which is adapted to permit issuance of up to eight tickets per price system per lane; to provide such an admission control system wherein a vehicle detector and counter is substantially non-defeatable and then only by a very large metal object, such as at least 10 to 12 feet long; to provide such an admission control system having counters for recording the number and the price of tickets dispensed and counters for vehicles in, vehicles out, passes, and for the number of alarms; to provide such an admission control system wherein spinning of tires and snow-plow blades have substantially no effect on vehicles detecting and counting circuits; to provide such an admission control system which is adapted to be observed by personnel stationed at a distance from the admission center; and to provide such an admission control system which is economical to manufacture, durable in construction, positive in operation, and particularly well adapted for the proposed use.

Other objects and advantages of this invention will become apparent from the following description taken in connection with the accompanying drawings wherein are set forth by way of illustration and example, certain embodiments of this invention.

The drawings constitute a part of this specification and include an exemplary embodiment of the present invention and illustrate various objects and features of the admission control system for use with an admission center through which vehicles normally pass and wherein a predetermined fare is normally collected.

FIG. 2 is a front elevational view of a display unit having a plurality of indicating elements.

FIG. 3 is a block diagram of the admission control system.

FIG. 4 is a schematic diagram showing circuits operative to drive the indicating elements of the display unit.

FIG. 6 is a schematic diagram showing circuits operative to generate an alarm signal in response to a vehicle passing the admission center without operation of a ticket dispensing unit or operation thereof beyond selected limits as to number and value of tickets.

FIG. 7 is a schematic diagram showing power supply circuits.

Figure 1:
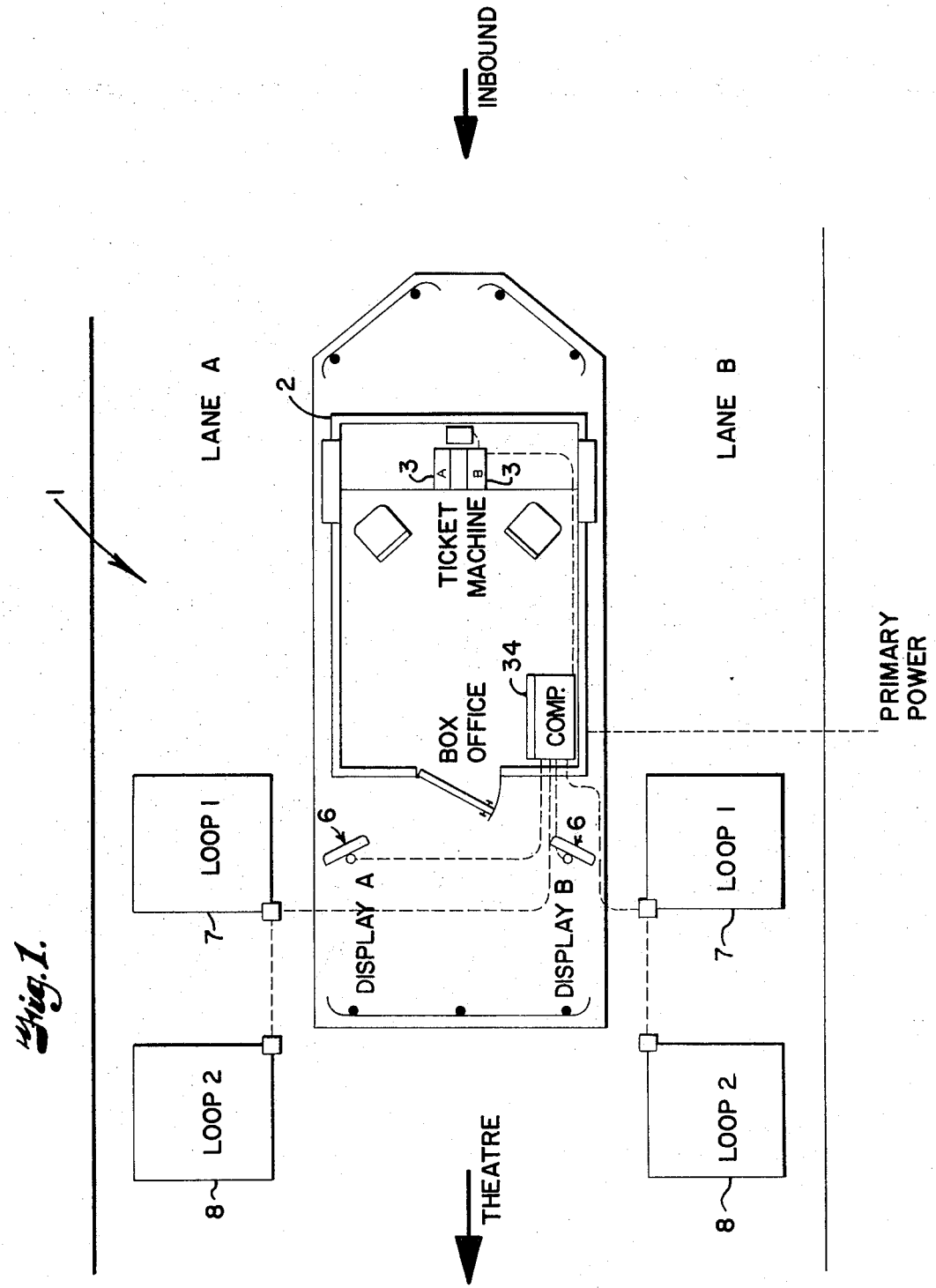
FIG. 1 is a plan view of an admission center having therein an admission control system embodying features of the present invention.
Figure 5:
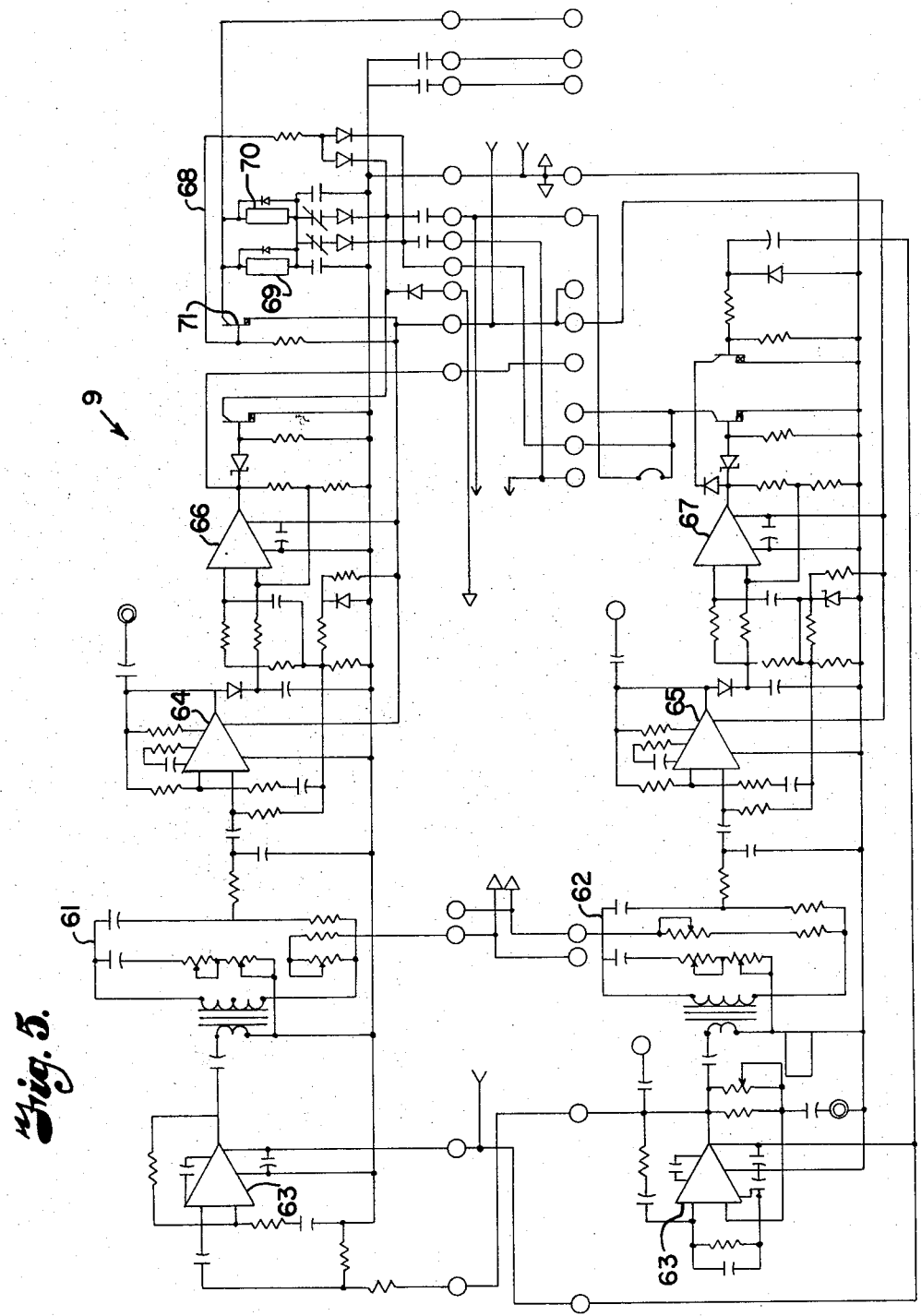
FIG. 5 is a schematic diagram showing circuits operative to detect a vehicle and the direction of travel thereof.
Figure 8:
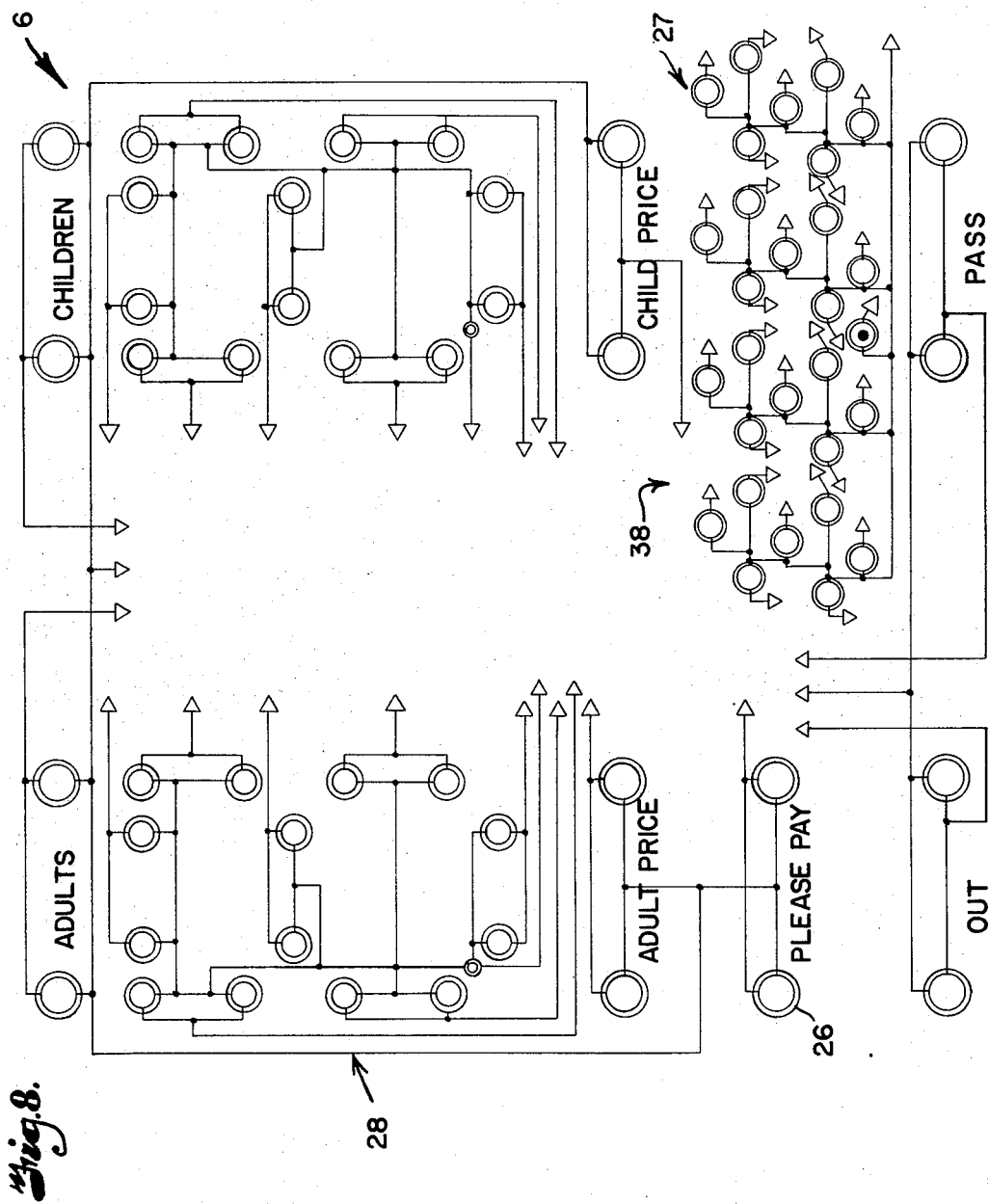
FIG. 8 is a schematic diagram showing patron display circuits.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

In the disclosed embodiment of the present invention, the reference numeral 1 generally designates an admission control system for use with an admission center 2 through which vehicles normally pass and wherein a predetermined fare is normally collected. The admission control system 1 includes a ticket dispensing assembly or unit 3 issuing one to five tickets for each actuation and has connection through electrical circuits to count the tickets for each admission and actuate indicating means in a display to show the admission price more particularly. The admission control system 1 includes at least one ticket dispensing assembly 3 and signal generating circuits 4 are activated by operation of the ticket dispensing unit 3 and in response to dispensing of tickets and are operative to generate a signal corresponding to the number of tickets dispensed and signal conversion circuits 5 are electrically connected to the signal generating circuits 4 and are operative to convert the generated signal to a drive signal operative to drive indicating elements of a display unit 6 to a position corresponding to the total price for the number of tickets dispensed. A vehicle detector and direction sensor is positioned adjacent the path of a vehicle passing the admission center or gate. In the system shown a pair of spaced loops 7 and 8 are positioned adjacent the admission center 2 and in a path of travel of vehicles passing through the admission center and are electrically connected to vehicle detecting circuits 9 which are operative to electrically detect a vehicle and the direction of travel thereof and to activate the signal generating circuits 4 and alarm assembly circuits 10 which are electrically connected to the vehicle detecting circuits 9 and to the signal generating circuits 4 and the alarm circuits 10 are operative to generate an alarm signal in response to a vehicle passing through the admission center 2 without operation of the ticket dispensing assembly 3 or operation thereof beyond selected limits as to number and value of tickets.

An adapter is mounted on the ticket dispensing unit 3 and includes a normally closed switch 11 operation of which completes a circuit which generates a signal in proportion to the number of tickets dispensed from the ticket dispensing unit 3 as by noting the number of time the spokes of a ticket advance wheel pass a designated point.

The signal generating circuits 4 include a pulse shaper circuit 12 electrically connected to the normally closed switch 11 and operative to produce a chain of fast-rise, fixed-width pulses corresponding to the number of tickets dispensed. The illustrated pulse shaper circuit 12 includes a single integrated circuit having two time constant components such as condensers 13 and 14 electrically connected thereto in a manner such that the circuit guarantees that the signal from the normally closed switch 11 is a valid signal while preventing any errors due to contact bounce within the adapter. An output 15 is thus a chain of fast-rise, fixed-width pulses corresponding to the number of tickets dispensed.

The signal conversion circuits 5 include a ticket counter circuit 16 having a single integrated circuit therein operative to convert the chain of pulses into a binary-coded signal representing the number of tickets dispensed. The ticket counter circuit 16 is reset to zero or off-condition after an inbound vehicle has been detected and counted, and the ticket counter circuit 16 has a plurality of outputs 17, 18, 19, and 20, for a purpose later described. The signal conversion circuits 5 also include decoder circuit 21 electrically connected to the outputs 17, 18, 19, and 20 of the ticket counter circuit 16 and adapted to reduce the binary-coded signal to a seven-segment format. The illustrated decoder circuit 21 includes a single integrated circuit in conjunction with a plurality of transitor amplifiers 22 all operative to accept the binary-coded signal from the ticket counter circuit 16 and present it in a format such that a seven-segment display may be driven for viewing by either the patron or an observer or monitor.

A second decoder circuit 23 is electrically connected to the decoder circuit 21 and is operative to reduce the binary-coded signal to a decimal format. One output 24 of an intergrated circuit is operative to drive a transitor amplifier 25 which controls the turning off or blanking of the "Please Pay" lamps 26 of the display unit 6 and total price lamps 27 which are operated by a totalizer display circuit 28 by means of a relay 29 and other output 30 of the second decoder circuit 23 is electrically connected to the alarm circuits 10 and is operative to indicate that more tickets than the equipment is programmed for have been dispensed.

The remaining outputs 31 of the second decoder circuit 23 are electrically connected to a price matrix circuit 32 which is operative to form a modified binary-coded-decimal code representing the total admission price for the number of tickets dispensed. The ilustrated price matrix circuit 32 includes two read only memory circuits electrically connected to two hex inverting integrated circuits which form the mechanism that stores the price information for one through eight patrons. It is noted that the read only memory circuits are custom programmed for each installation and that the twelve outputs 33 of the integrated circuits of the price matrix circuit 32 are operative to form a modified binary-coded-decimal code representing the total admission price for the class of tickets.

The pulse shaper circuit 12, the ticket counter circuit 16, the decoder circuit 21, the second decoder circuit 23, and the price matrix circuit 32 are enclosed within a computer 34 positioned within the admission center 2. When the admission control system 1 is employed in a single lane and single price installation, the outputs 33 of the price matrix circuit 32 are electrically connected to a signal converter circuit 35 which is operative to convert the modified binary-coded-decimal code to a seven-segment format for driving the indicating elements of the display unit 6. The illustrated signal converter circuit 35 includes three integrated circuits having sufficient gain to directly drive the total price lamps 27 in the display unit 6 and two transitor amplifiers 36 and 37 are operative to drive the zero or the five-figure in the penny slot of the total price lamps 27. The signal converter circuit 35 is also positioned within the computer 34.

The signal converter circuit 35 is electrically connected to a totalizer assembly 38 within the display unit 6. The totalizer assembly 38 consists of a plurality of minature lamps capable of displaying any number from 00.00 to 99.99 in what is known as a seven-segment format. The electronics that drive these lamps, however, limit the totalizer capability to the range of 00.00 to 99.95.

When there are two prices of tickets to be dispensed to passengers of vehicles passing through the admission center 2, a second ticket dispensing unit 39 having a normally closed switch 40 is positioned within the admission center 2 and is electrically connected to a second pulse shaper circuit 41 which is electrically connected to a second ticket counter circuit 42 which is in turn electrically connected to a third decoder circuit 43 and a fourth decoder circuit 44 which are electrically connected to a second price matrix circuit 45 thereby defining second signal generating circuits and second signal conversion circuits for use when a second class of tickets is to be dispensed.

In the illustrated embodiment, the price matrix circuit 32 and the second price matrix circuit 45 are electrically connected to an adder circuit 46 which is operative to add electrically the respective modified binary-code-decimal codes formed by the price matrix circuit 32 and the second price matrix circuit 45 in a binary-coded total by use of a single one-bit adder 47 and three four-bit adders 48. The adders 47 and 48 are operative to sum the primary admission price and the secondary admission price.

The adder circuit 46 is electrically connected to a conversion circuit 49 which is adapted to receive the binary-coded total and operative to return to the binary-coded-decimal code for the correct display of information by the display unit 6. The illustrated conversion circuit 49 includes three medium-scale-integrated (MSI) devices which generate a 13-bit output representing the total admission fee. The output drives the display driver assembly 50 which is electrically connected to the totalized assembly 38 within the display unit 6.

The conversion circuit 49 is also operative to drive an optional accumulator assembly 51. It is noted that a carry signal of the most significant converter (representing $100.00) is used as an alarm signal that the computer is being operated in excess of its capabilities. The conversion circuit 49 is electrically connected to the signal converter circuit 35 which is operative to convert the binary-coded total to the required 7-segment format for use by the three integrated circuits in the signal converter circuit 35.

The alarm assembly circuits 10 includes a pass circuit 52 electrically connected to the ticket dispensing unit 3 and to the vehicle detecting circuits 9 and the pass circuit 52 is operative to drive selected indicating elements of the display unit 6 to indicate permitted movement of a vehicle in a selected direction through the admission center 2.

A turnaround is a permitted movement by a vehicle through the admission center 2 on the driver's honesty that the vehicle immediately leave and includes delivery, guards, and the like. The alarm assembly circuits 10 also includes a turn-around (out) circuit 53 electrically connected to the ticket dispensing unit 3 and to the vehicle detecting circuits 9 and the turnaround (out) circuit 53 is operative to drive other selected indicating elements of the display unit 6 to indicate a permitted movement of a vehicle in a selected direction through the admission center 2.

In the illustrated embodiment, the pass circuit 52 and the turnaround (out) circuit 53 have push-button switches 54 and 55 respectively electrically connected to the ticket dispensing unit 3 whereby the switches 54 and 55 control a six-digit mechanical counter for recording of pass and turnaround (out) movements through the admission center 2 respectively. The switches 54 and 55 are each adapted to trigger a respective one-half of a bistable multivibrator by means of a hex inverter. The output of the integrated circuit drives a power transitor 56 that operates the pass indicator and the turnaround (out) indictor within the display unit 6. The multivibrator is reset upon the completion of a detection cycle of an inbound vehicle.

The pass circuit 52 and the turnaround (out) circuit 53 are electrically connected to an alarm circuit portion 57 having a relay 58 operative to generate an alarm signal in response to an unpermitted movement of a vehicle through the admission center 2. The illustrated alarm circuit portion 57 includes two integrated circuit gates operative to generate an alarm signal in the event that: (1) a vehicle passes through the admission center 2 without any primary price tickets being dispensed; (2) a vehicle passes through the admission center 2 without any secondary price tickets being dispensed; (3) a vehicle passes through the admission center 2 without any pass transaction; and (4) a vehicle passes through the admission center 2 without any turnaround (out) transaction wherein the alarm circuit portion 57 is operative to generate the alarm signal in response to a vehicle passing through the admission center in a selected direction without operation of the ticket dispensing unit 3 or the second ticket dispensing unit 39.

The alarm circuit portion 57 is also operative to generate an alarm signal when one of the following events occur: (1) more than eight tickets of a primary class are dispensed; (2) more than eight tickets of a secondary class are dispensed; and (3) more than $100.00 of tickets are dispensed wherein the alarm circuit portion 57 is operative to generate the alarm signal in response to operation of the ticket dispensing units beyond selected limits as to number and value of tickets. The alarm circuit portion 57 is also operative to generate an alarm signal in response to loss of or removal of primary power.

In any of the above alarms, the relay 57 will drop out thereby activating a six-digit mechanical counter 59 as well as operating an external alarm that may be connected to the system. It is preferable that the alarm circuits 10 have a removable jumper wherein the installer may determine whether an automatic or a manual reset of the alarm circuits 10 is desired.

The alarm assembly circuits 10 include a display control portion having a relay 60 which is operated if either of the ticket dispensing units 3 and 39 dispenses any tickets. Upon operation the relay 60 turns on the "Please Pay" lamps 26 of the display unit 6.

Means are positioned adjacent the admission center 2 and in a path of travel of vehicles passing through the admission center 2 for electrically detecting a vehicle and the direction of travel thereof and electrically connected to the signal generating circuits 4 for activating same. In the illustrated embodiment, the means includes the vehicle detecting circuits 9 and the loops 7 and 8 which are each positioned within a roadway surface at respective selected spaced locations adjacent the admission center 2. The loops 7 and 8 each are electrically responsive to movement of a vehicle thereover.

First and second bridge circuits 61 and 62 have the loops 7 and 8 respectively forming one leg thereof and the first and second bridge circuits 61 and 62 are adapted to be adjusted to have a selected output signal.

An oscillator circuit 63 is electrically connected to the first and second bridge circuits 61 and 62 and is operative to excite same in response to movement of a vehicle over the loops 7 and 8. In the illustrated embodiment, a linear power amplifier integrated circuit has positive feed-back and is operative to produce a 30,000 Hertz sine-wave signal. The frequency of oscillation is controlled by two precision R-C networks attached to the positive feed-back. The amplitude of the oscillations is controlled by using negative resistance characteristics of a minature lamp connected in the negative feed-back loop.

First and second signal amplifier circuits 64 and 65 are electrically connected to the first and second bridge circuit 61 and 62 respectively and are operative to amplify the respective output signal therefrom. In the illustrated embodiment, a single linear operational amplifier is used to amplify the feeble output signal of the first bridge circuit and the second bridge circuit 61 and 62 respectively. A simple bandpass filter is included at the input of each of the first and second signal amplifier circuits 64 and 65 to reduce noise perturbations. An output signal from the first and second signal amplifier circuits 64 and 65 is peak rectified by means of a diode and capacitor connected to an output of the respective circuit.

First and second level detector circuits 66 and 67 are electrically connected to the first and second signal amplifier circuits 64 and 65 respectively and each are operative to electrically determine presence of an unbalance in the respective first and second bridge circuit 61 and 62 and to change a low-state to a high-state at a selected signal amplitude. The first and second level detector circuits 66 and 67 each include an integrated circuit having a resistor between the output and the input thereof to enhance switching time and to provide a controlled amount of hysterisis. The output of the level detector circuits 66 and 67 each drive a transistor that controls a vehicle direction sense circuitry, as later described, and the circuits 66 and 67 each include a network which automatically corrects the system for long-term drifts.

A direction sense circuit 68 is electrically connected to the first and second level detector circuits 66 and 67 and has a first and second relay 69 and 70 respectively and a transistor 71 responsive to time separation of loop crossings whereby one relay, for example relay 69, will operate for one direction of travel and the other relay 70 will operate for the other direction of travel of a vehicle over the loops 7 and 8.

Operation of the relay 69 is operative to advance a vehicles-in counter 72 one digit. Operation of the relay 70 prevents the vehicles-in counter 72 from advancing. The vehicles-in counter 72 generates a signal that is used in the alarm circuits 10 and as a clearing signal to the display unit 6.

Power in the form of 115 volt alternating current line power is supplied to the admission control system 1 by means of a conductor 73 and a switch 74 is positioned in the conductor 73 to turn on and off the line power. A fuse 75 is positioned adjacent the switch 74 for protecting the admission control system. The line power is immediately lowered to safe voltage levels and is rectified. A power circuit 76 includes a first combination 77 having a transformer 78, a rectifier 79, and a filter 80 which provides direct current power for all the electronics of the admission control system 1. A second combination 81 includes a transformer 82, a rectifier 83, and a filter 84 which provides power to all the lamps within the display unit 6.

The power circuit 76 incorporates two solid state regulators 85 and 86 which are electrically connected to the filters 80 and 84 and are operative to provide accurate voltages of 5.00 and 15.00 volts direct current to the computer 34 for operation thereof.

Operation of an admission control system 1, constructed as illustrated and described, includes turning the switch 74 to the ON position thereby energizing the computer 34 and the lamps in the display unit 6. Operation of the ticket dispensing units 3 and 39 activates respective signal generating circuits and signal conversion circuits which are electrically connected to the display unit 6. Movement of the vehicles over the loops 7 and 8 activates the vehicle detecting circuits 9 and the alarm circuits 10 when the movement is unpermitted as by failure to operate the respective ticket dispensing assembly or operation of the ticket dispensing assembly in excess of selected limits, such as number of tickets and total value thereof. The admission control system 1 is thereby operative to display the total admission price on the display unit 6 in response to operation of the ticket dispensing units 3 and 39. The admission control system 1 is operative to add data of the admission charges by means of an accumulator 51 which is electrically connected to the signal converter circuit 35. Information concerning the admission price may be remoted to any desired location via an open telephone line whereby real time data can be provided to a central computer. Ticket counters are located within the ticket dispensing assembly 3 and the second ticket dispensing assembly 39 for counting the number of tickets dispensed therefrom and all other counters are located within the computer 34.

It is to be understood that while I have illustrated and described one form of my invention, it is not to be limited to the specific form or arrangement of parts herein described and shown.

What I claim and desire to secure by Letters Patent is:

1. An admission control system for use with an admission center through which vehicles normally pass and wherein a predetermined fare is normally collected, said admission control system comprising:
   a. ticket dispensing means and signal generating means activated by said ticket dispensing means and in response to dispensing of tickets therefrom for generating a signal corresponding to the number of tickets dispensed;
   b. a display unit having a plurality of indicating elements;
   c. means electrically connected to said display unit and to said signal generating means for converting the generated signal to a drive signal operative to drive the indicating elements to a position corresponding to the price for the number of tickets dispensed;
   d. means positioned adjacent a path of travel of vehicles passing through an admission center for electrically detecting a vehicle and the direction of travel thereof and electrically connected to said signal generating means for activating same; and
   e. alarm means electrically connected to said means for detecting a vehicle and to said signal generating means and operative to generate an alarm signal in response to a vehicle passing through the admission center without operation of said ticket dispensing means.

2. An admission control system as set forth in claim 1 wherein:
   a. said signal generating means comprises switch means activated by operation of said ticket dispensing means and pulse shaper circuit means electrically connected to said switch means for producing a chain of pulses corresponding to the number of tickets dispensed; and
   b. said means for converting the generated signal to a drive signal includes:
      1. ticket counter circuit means electrically connected to said pulse shaper circuit means and operative to convert pulses therefrom into a binary-coded signal representing the number of tickets dispensed;
      2. decoder means electrically connected to said ticket counter circuit means and operative to reduce the binary-coded signal to a decimal format;
      3. price matrix circuit means electrically connected to said decoder means and operative to form a modified binary-coded-decimal code representing the total admission price for the number of tickets dispensed; and
      4. signal converter circuit means electrically connected to said price matrix circuit means and operative to convert the modified binary-coded-decimal code to a seven-segment format for driving the indicating elements of said display unit.

3. An admission control system as set forth in claim 1 including:
   a. second ticket dispensing means and second signal generating means activated by said second ticket dispensing means and in response to dispensing of tickets therefrom for generating a signal corresponding to the number of tickets dispensed by said second ticket dispensing means; and
   b. means electrically connected to said second signal generating means and to said first named signal generating means for electrically adding the first named generated signal and the second generated signal, said means for adding the first named generated signal and the second generated signal being electrically connected to said vehicle detecting means and to said means for converting the generated signal to a drive signal whereby the indicating elements are driven to a position corresponding to the price for the number of tickets dispensed by said first named and second ticket dispensing means.

4. An admission control system as set forth in claim 3 wherein:
   a. said first named signal generating means and said second signal generating means each comprise switch means activated by operation of said respective ticket dispensing means and a plurality of pulse shaper circuit means each electrically connected to a respective one of said switch means for producing a chain of fast-rise fixed-width pulses corresponding to the number of tickets dispensed by said respective ticket dispensing means; and
   b. said means for converting the generated signal to a drive signal includes:
      1. a plurality of ticket counter circuit means each electrically connected to a respective one of said pulse shaper circuit means and each operative to convert pulses therefrom into a respective binary-coded signal representing the number of tickets dispensed by the respective ticket dispensing means;
      2. a plurality of decoder means each electrically connected to a respective one of said ticket counter circuit means and each operative to reduce the respective binary-coded signal to a decimal format;
      3. a plurality of price matrix circuit means each electrically connected to a respective one of said decoder means and each operative to form a modified binary-coded-decimal code representing the respective total admission price for the number of tickets dispensed by said respective ticket dispensing means; and
      4. signal converter circuit means electrically connected to said means for electrically adding the firt named generated signal and the second generated signal and operative to convert the modified binary-coded-decimal code to a seven-segment format for driving the indicating elements of said display unit.

5. An admission control system as set forth in claim 4 wherein said means for electrically adding the first named generating signal and the second generated signal are electrically connected to said signal converter circuit means and to said respective means for converting the generated signals to a drive signal and comprises:
   a. adder circuit means electrically connected to each said respective price matrix circuit means and operative to electrically add the modified binary-coded-decimal codes formed thereby in a binary-coded total; and
   b. conversion circuit means electrically connected to said signal converter circuit means and to said adder circuit means and operative to convert the binary-coded total to a binary-coded-decimal code representing the total admission price.

6. An admission control system as set forth in claim 1 wherein said means for electrically detecting a vehicle and the direction of travel thereof includes:
   a. vehicle sensing means responsive to a vehicle passing thereby and positioned adjacent an admission center through which vehicles normally pass and wherein a predetermined fare is normally collected;
   b. bridge circuit means electrically connected to said vehicle sensing means and adapted to be adjusted to have a selected output signal;
   c. oscillator circuit means electrically connected to said bridge circuit means and operative to excite same in response to movement of a vehicle by said vehicle sensing means;
   d. signal amplifier circuit means electrically connected to said bridge circuit means and operative to amplify output signals therefrom;
   e. level detector circuit means electrically connected to said signal amplifier circuit means and operative to electrically determine presence of an unbalance in said bridge circuit means and to change from a low-state to a high-state at a selected signal amplitude; nd
   f. direction sense circuit means electrically connected to said level detector circuit means and responsive to time separation of a vehicle passing selected spaced locations adjacent the admission center.

7. An admission control system as set forth in claim 1 wherein said means for electrically detecting a vehicle and the direction of travel thereof includes:
   a. spaced apart first and second loop means each positioned within a roadway surface at respective selected locations adjacent the admission center, said loop means each being electrically responsive to movement of a vehicle over same;
   b. first and second bridge circuit means each having a respective one of said first and second loop means forming one leg thereof and each adapted to be adjusted to have a selected output signal;
   c. an oscillator circuit means electrically connected to said first and second bridge circuit means and operative to excite same in response to movement of a vehicle over said respective loops;
   d. first and second signal amplifier circuits each electrically connected to a respective one of said first and second bridge circuit means and operative to amplify the respective output signal therefrom;
   e. first and second level detector circuit means each electrically connected to a respective one of said first and second signal amplifier circuits and each operative to electrically determine presence of an unbalance in said respective first and second bridge circuit means and to change from a low-state to a high-state at a selected signal amplitude; and
   f. a direction sense circuit means electrically connected to said first and second level detector circuit means and having a first and second relay and a transistor and responsive to time separation of loop crossings whereby one relay will operate for one direction of travel and the other relay will operate for the other direction of travel of a vehicle over said first and second loop means.

8. An admission control system as set forth in claim 7 wherein said alarm means includes:
   a. pass circuit means electrically connected to said ticket dispensing means and to said direction sense circuit means and operative to drive selected indicating elements of said display unit to indicate permitted movement of a vehicle in a selection direction through the admission center;
   b. turnaround circuit means electrically connected to said ticket dispensing means and to said direction sense circuit means and operative to drive other selected indicating elements of said display unit to indicate permitted movement of a vehicle in the selected direction; and
   c. alarm circuit means electrically connected to said pass circuit means and to said turnaround circuit means and having relay means operative to generate the alarm signal in response to an unpermitted movement of a vehicle through the admission center.

9. An admission control system for use with an admission center through which vehicles normally pass and wherein a predetermined fare is normally collected, said admission control system comprising:
   a. first and second ticket dispensing means;
   b. first and second signal generating means electrically connected to and activated by a respective one of said first and second ticket dispensing means and in response to dispensing of tickets therefrom for generating signal corresponding to the respective number of tickets dispensed;
   c. a display unit having a plurality of indicating elements;
   d. means electrically connected to said display unit and to said first and second signal generating means and operative to convert the generated signal to a drive signal operative to drive the indicating elements to a position corresponding to the price for the total number of tickets dispensed;
   e. means positioned adjacent an admission center and in a path of travel of vehicles passing through the admission center for electrically detecting a vehicle and the direction of travel thereof and electrically connected to said first and second signal generating means for activating same; and
   f. alarm means electrically connected to said means for detecting a vehicle and to said first and second signal generating means and operative to generate an alarm signal in response to a vehicle passing through the admission center without operation of said respective first and second ticket dispensing means.

10. An admission control system as set forth in claim 9 including:
    a. means electrically connected to said means for electrically detecting a vehicle and the direction of travel thereof and to said alarm means for counting the vehicles passing through the admission center and for counting the number of alarm signals generated; and
    b. means electrically connected to said first and second ticket dispensing means and to said alarm means for counting permitted movements of vehicles passing through the admission center without paying a predetermined fare.

11. An admission control system as set forth in claim 9 wherein said means for electrically detecting a vehicle and the direction of travel thereof includes:
    a. spaced apart first and second loop means each positioned within a roadway surface at respective selected locations adjacent the admission center, said loop means each being responsive to movement of a vehicle over same;
    b. first and second bridge circuit means each having a respective one of said first and second loop means forming one leg thereof and each adapted to be adjusted to have a selected output signal;
    c. an oscillator circuit means electrically connected to said first and second bridge circuit means and operative excite same in response to movement of a vehicle over said respective first and second loop means;
    d. first and second amplifier circuit means each electrically connected to a respective one of said first and second bridge circuit means and operative to amplify the respective output signal therefrom;
    e. first and second level detector circuit means each electrically connected to a respective one of said first and second signal amplifier circuits and each operative to electrically determine presence of an unbalance in said respective first and second bridge circuit means and to change from a low-state to a high-state at a selected signal amplitude; and
    f. a direction sense circuit means electrically connected to said first and second level detector circuit means and having a first and a second relay and a transistor and responsive to time separation of loop crossings whereby one relay will operate for one direction of travel and the other relay will operate for the other direction of travel of a vehicle over said first and second loop means.

12. An admission control system as set forth in claim 11 wherein:
   a. said alarm means includes:
      1. pass circuit means electrically connected to said first and second ticket dispensing means and to said direction sense circuit means and operative to drive selected indicating elements of said display unit to indicate permitted movement of a vehicle in a selected direction through the admission center;
      2. turnaround circuit means electrically connected to said first and second ticket dispensing means and to said direction sense circuit means and operative to drive other selected indicating elements of said display unit to indicate permitted movement of a vehicle in a direction opposite the selected direction; and
      3. alarm circuit means electrically connected to said pass circuit means and to said turnaround circuit means and having relay means operative to generate the alarm signal in response to an unpermitted movement of a vehicle through the admission center;
   b. means are electrically connected to said means for electrically detecting a vehicle and the direction of travel thereof and to said alarm means for counting the vehicles passing through the admission center and for counting the number of alarm signals generated; and
   c. means are electrically connected to said first and second ticket dispensing means and to said alarm means for counting permitted movements of vehicles passing through the admission enter without paying a predetermined fare.

13. An admission control system as set forth in claim 12 wherein:
   a. said first named signal generating means and said second signal generating means each comprise switch means activated by operation of said respective ticket dispensing means and a pair of pulse shaper circuit means each electrically connected to a respective one of said switch means for producing a chain of fast-rise fixed-width pulses corresponding to the number of tickets dispensed by said respective ticket dispensing means;
   b. said means for converting the generated signals to a drive signal includes:
      1. a pair of ticket counter circuit means each electrically connected to a respective one of said pulse shaper circuit means and each operative to convert pulses therefrom into a respective binary-coded signal representing the number of tickets dispensed by the respective ticket dispensing means;
      2. a pair of decoder means each electrically to a respective one of said ticket counter circuit means and each operative to reduce the respective binary-coded signal to a decimal format;
      3. a pair of price matrix circuit means each electrically connected to a respective one of said decoder means and each operative to form a modified binary-coded-decimal code representing the respective total admission price for the number of tickets dispensed by said respective ticket dispensing means; and
      4. signal converter circuit means electrically connected to said means for electrically adding the first named generated signal and the second generated signal and operative to convert the modified binary-coded-decimal code to a seven-segment format for driving the indicating elements of said display unit; and
   c. said means for electrically adding the first named generating signal and the second generated signal are electrically connected to said signal converter circuit means and to said respective means for converting the generated signals to a drive signal and comprises:
      1. adder circuit means electrically connected to each said respective price matrix circuit means and operative to electrically add the modified binary-coded-decimal codes formed thereby in a binary-coded total; and
      2. conversion circuit means electrically connected to said signal converter circuit means and to said adder circuit means and operative to convert the binary-coded total to a binary-coded-decimal code representing the total admission price.

* * * * *